United States Patent [19]

Thompson

[11] E Re. 29,717

[45] Reissued Aug. 1, 1978

[54] AUTOMATIC VOLUME ADJUSTING FIRE HOSE NOZZLE WITH FLUSHING MECHANISM

[75] Inventor: William S. Thompson, Elkhart, Ind.

[73] Assignee: Elkhart Brass Manufacturing Co., Inc., Elkhart, Ind.

[21] Appl. No.: 670,263

[22] Filed: Mar. 25, 1976

Related U.S. Patent Documents

Reissue of:

[64] Patent No.: 3,893,624
Issued: Jul. 8, 1975
Appl. No.: 508,064
Filed: Sep. 23, 1974

[51] Int. Cl.[2] ..... B05B 1/32; B05B 15/02

[52] U.S. Cl. ..... 239/107; 239/453; 239/458

[58] Field of Search ..... 239/456, 107, 106, 452, 239/453, 458, 459

[56] References Cited

U.S. PATENT DOCUMENTS

| | | | |
|---|---|---|---|
| 2,991,016 | 7/1961 | Allenbaugh, Jr. | 239/456 X |
| 3,012,733 | 12/1961 | Allenbaugh, Jr. | 239/458 |
| 3,150,829 | 9/1964 | Specht et al. | 239/458 X |
| 3,387,791 | 6/1968 | Allenbaugh, Jr. | 239/458 |
| 3,539,112 | 11/1970 | Thompson | 239/452 |

*Primary Examiner*—Joseph F. Peters, Jr.
*Assistant Examiner*—Michael Mar
*Attorney, Agent, or Firm*—James D. Hall

[57] ABSTRACT

A fire hose nozzle having a tubular body part and a pressure responsive valve assembly shiftable in the body part. A barrel member spacedly encircles parts of the pressure responsive valve assembly and is shiftable toward and away from the valve head of the assembly for the purpose of allowing flushing of the valve.

9 Claims, 4 Drawing Figures

AUTOMATIC VOLUME ADJUSTING FIRE HOSE NOZZLE WITH FLUSHING MECHANISM

Matter enclosed in heavy brackets [ ] appears in the original patent but forms no part of this reissue specification; matter printed in italics indicates the additions made by reissue.

BACKGROUND OF THE INVENTION

This invention relates to a fire hose nozzle of the automatic volume adjustment type.

In the fire hose nozzle described and illustrated in U.S. Pat. No. 3,539,112 means are provided for automatically adjusting its water discharge rate upon variation of water pressure so as to maintain an effective fire fighting water stream range. It has been found that during use of this type nozzle, small stones and other foreign water carried obstructions tend to lodge in the outlet of the nozzle at the head of its shiftable valve assembly. To clear the nozzle of these obstructions the nozzle must be turned off and partly diassembled. This necessity for shutting off the water flow through the nozzle during its fire fighting use not only reduces the extinguishing qualities of the fire fighting equipment but is also may subject the fire fighter or nozzle operator to danger from the fire by interrupting the water curtain produced by the nozzle.

In this invention means are provided in which a nozzle of the automatic volume adjustment type may be flushed without interrupting the nozzle's use.

SUMMARY OF THE INVENTION

This invention relates to a fire hose nozzle having a valve assembly therein which is shiftable in response to variations in liquid or water pressure for the purpose of maintaining generally the same operative trajectory or reach of the liquid stream for fire fighting purposes. The fire hose nozzle construction is improved upon by incorporating means by which the nozzle may be flushed for the purpose of ridding pebbles and other foreign matter which is clogging the nozzle without having to turn off the nozzle.

A barrel member which forms a part of the nozzle construction surrounds parts of the pressure responsive valve assembly of the nozzle and in conjunction with the head of the valve assembly serves to regulate the discharge pattern of the liquid flowing through the nozzle. Means are provided by which the barrel member can be shifted longitudinally of the nozzle so as to increase the spacing between the barrel member and head of the valve assembly while liquid is flowing through the nozzle for the purpose of dislodging the matter which was previously wedged between the valve assembly head and barrel member and which was obstructing flow through the valve.

Accordingly, it is an object of this invention to provide a fire hose nozzle having means for flushing the nozzle of obstructing matter without shutting off liquid flow through the nozzle.

Another object of this invention is to provide a fire hose nozzle which includes means for automatically adjusting the discharge or volume rate of the nozzle in response to variations in liquid pressure to the nozzle, and which additionally includes means for flushing the nozzle while maintaining liquid flow therethrough.

Still another object of this invention is to provide a fire hose nozzle with automatic volume adjustment which may be flushed while maintaining a protective water curtain for the operator of the nozzle.

Other objects of this invention will become apparent upon a reading of the invention's description.

BRIEF DESCRIPTION OF THE DRAWING

A preferred embodiment of this invention has been chosen for purposes of illustration and description wherein.

DESCRIPTION OF THE PREFERRED EMBODIMENT

Figure 1:
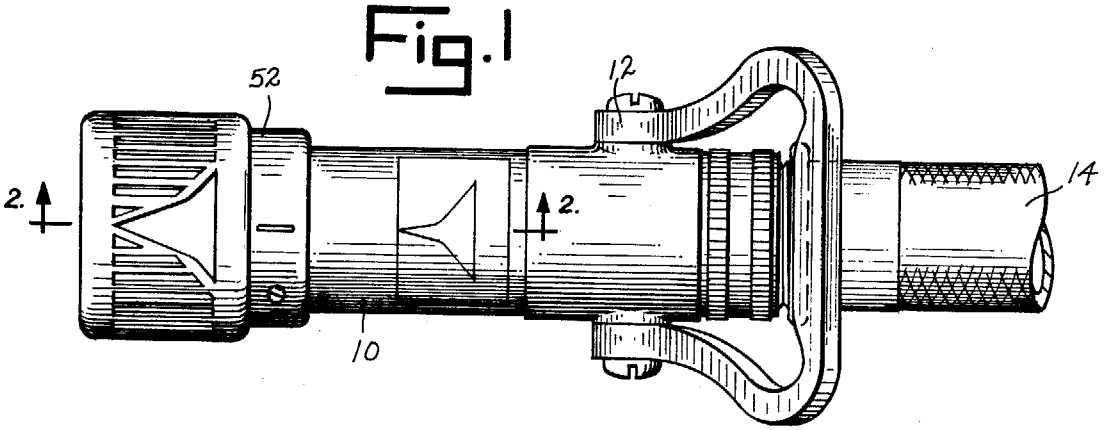
FIG. 1 is a top plan view of the nozzle.
Figure 3:
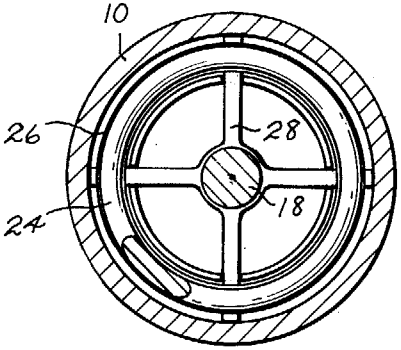
FIG. 3 is a cross sectional view taken along line 3—3 of FIG. 2.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The valve illustrated in FIGS. 1–4 includes a tubular body part 10 which is cylindrical in configuration and which has an "on/off" valve assembly 12 connected at one end. Valve assembly 12, which is not shown in detail, may be of the handle actuated ball valve type commonly used as a shut off valve in fire nozzles. In other constructions of this invention, the nozzle may not have its own shut off valve. The manner in which fire hose 14 is connected to body part 10 and the manner in which water flow through the nozzle is turned on and shut off are matters of design and convenience and need not constitute a part of this invention.

A water discharge valve assembly 16 is located within body part 10 and includes a stem 18 and a head 20. A tube 22 is located coaxially within body part 10. A helical spring 24 surrounds tube 22 and is positioned between the tube and the inner surface of body part 10. One end of spring 24 abuts a washer 26 which in turn abuts a four-flanged spider 28. Spider 28 is connected to valve stem 18 and forms a part of discharge valve assembly 16. The opposite end of spring 24 abuts a spacer ring 30 which in turn is retained within body part 10 in contact with tube 22 by means of a retainer ring 32. Retainer ring 32 is externally threaded and is turned into body part 10 which has engaging internal threads formed therein. Tube 22 is slotted at 34 to accommodate the flanges of spider 28 with clearance as valve stem 18 and valve head 20 shift longitudinally with respect to body part 10, causing the compression of spring 24, during water flow through the nozzle.

A barrel member 36, formed by an annular side wall, has its aft end 38 fitted slidably into retainer ring 32. Barrel member 36 spacedly surrounds stem 18 of the discharge valve assembly 16 and preferably has an inner diametrical dimension similar in size to the inner diameter of tube 22 so as to define a water flow path through the nozzle. The forward end 40 of barrel member 36 is beveled and is positioned adjacent head 20 of the discharge valve assembly 16. Valve stem 18 carries a spider 42 whose flanges contact the inner surface of barrel member 36 and serve with spider 28 to coaxially position the valve relative to the barrel member and tube 22.

Figure 2:
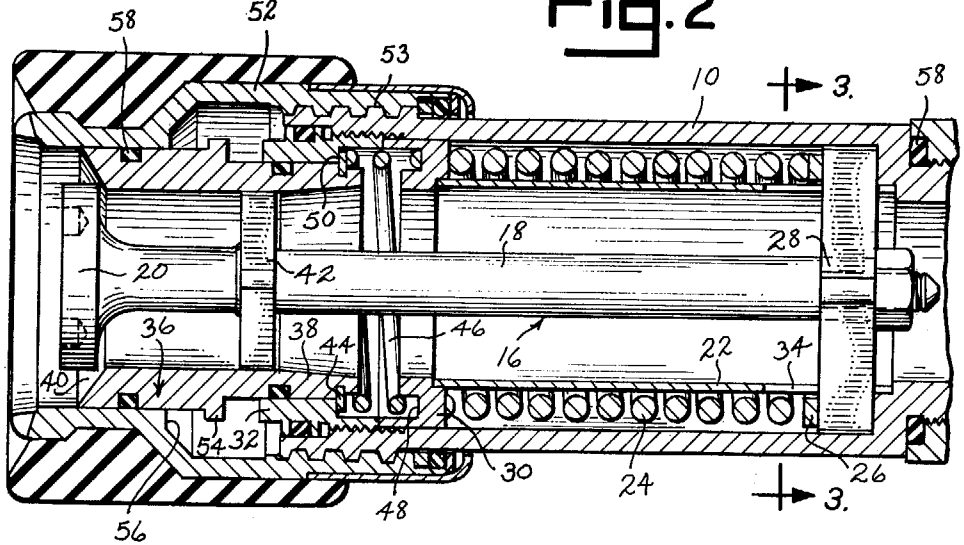
FIG. 2 is a fragmentary sectional view taken along line 2—2 of FIG. 1 showing the component parts of the nozzle in operative fire fighting position.

Aft end 38 of barrel member 36 includes a stop ring 44. A helical spring 46 surrounds valve assembly stem 18 and is located between shouldered components of spacer ring 30 and retainer ring 32. One end of spring 46 abuts shoulder 48 of spacer ring 30 and the opposite end of the spring abuts stop ring 44 of barrel member 36, causing the barrel member to be urged into a normal forward position with the stop ring contacting shoulder 50 of retainer ring 32, as seen in FIG. 2. When stop ring 44 abuts shoulder 50 of retainer ring 32, the forward end 40 of barrel member 36 spacedly surrounds valve head 20 so as to produce a desired water flow trajectory through the nozzle for a given amount of water pressure. As the water flows through tube 22 and barrel member 36 and around the valve head 20, the contact of the water with the head will cause a shifting of the head and valve stem and a resulting compression of spring 24. Thus as the water pressure within nozzle 10 varies, so will the spacing between valve head 20 and forward end 40 of barrel member 36 vary. This provides a means, as described in greater detail in U.S. Pat. No. 3,539,112, for adjusting the discharge rate of the nozzle without substantial sacrifice of the reach or trajectory of the water being emitted from the nozzle.

Figure 4:
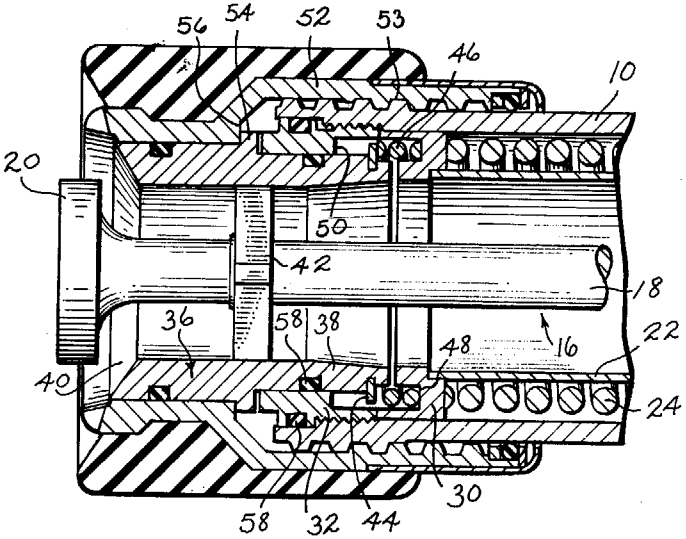
FIG. 4 is a fragmentary sectional view like FIG. 2 showing component parts of the nozzle positioned to enable the nozzle to be flushed of flow obstructing matter.

A sleeve 52 surrounds barrel member 36 and is threadably connected at 53 to body part 10. Sleeve 52 is a common component of fire nozzles and is utilized upon rotation relative to body part 10 to vary the discharge pattern of the water flowing through the nozzle. In this invention, sleeve 52 serves the important additional purpose of shifting barrel member 36 rearwardly when it becomes necessary to flush the nozzle. This sleeve induced movement of barrel member 36 is effected by providing the barrel member with an annular flange 54. As sleeve 52 is turned onto body part 10 of the nozzle, an internal shoulder 56 of the sleeve is caused to abut flange 54 of the barrel member with the barrel member being urged rearwardly relative to discharge valve assembly 16, as shown in FIG. 4, causing compression of helical spring 46. As barrel member 36 is urged rearwardly by sleeve 52, its fore end 40 is moved to a rearwardly spaced position from head 20 of the valve assembly to permit obstructing matter, such as pebbles and dirt, and to be flushed from the nozzle with water flow through the nozzle being maintained in the form of a protective curtain or screen. Once the nozzle has been flushed, sleeve 52 is rotated so as to be located in its extended position, allowing spring 46 to urge barrel member 36 into its normal operating position, as seen in FIG. 2. O-rings 58 are provided between selected components of the nozzle to provide water sealing fixed or sliding fits.

In some constructions of this invention it may not be necessary to include helical spring 46 as a means to normally urge barrel member 42 into its forward position with stop ring 44 engaging retainer ring 32. Water flow through the nozzle may be sufficient when contacting the inner walls of the barrel member to normally urge the member into its forward retainer ring engaging position.

It is to be understood that the invention is not to be limited to the details above given but may be modified within the scope of the appended claims.

What I claim is:

1. In a fire hose nozzle including a tubular body part having an inlet end and an outlet end, a pressure responsive valve assembly shiftable in said body part and including a valve head and a valve stem, said valve head being shiftable toward and away from said body part outlet in response to variations in pressure of liquid supplied to said nozzle, the improvement comprising a barrel member having fore and aft ends surrounding said valve stem, the aft end of the said barrel member fitting slidably within the outlet end of said body part, said barrel member being shiftable longitudinally relative to said body part between a forward position in which the barrel member fore end spacedly encircles said valve head to define a liquid flow path from the nozzle and a rearward position in which the barrel member fore end is shifted rearwardly of the valve head to increase the spacing between the barrel member and valve head, a sleeve member encircling the fore end of said body part and surrounding said barrel member, means rotatably connecting said sleeve member to said body part wherein rotation of the sleeve member upon the body part causes the sleeve member to shift longitudinally of the body part between extended and retracted positions, said sleeve member including abutment part means for contacting said barrel member to shift the barrel member from its forward position into its rearward position as said sleeve member is shifted from its extended position into its retracted position.

2. The fire hose nozzle of claim 1 and biasing means yieldably urging said barrel member into its forward position.

3. The fire hose nozzle of claim 2 wherein said biasing means is a helical spring encircling said valve stem and abutting each of said barrel member and body part.

4. The fire hose nozzle of claim 2 wherein said sleeve means extends beyond said valve head in an annular spaced relationship to define in conjunction with said valve head and barrel member a liquid flow outlet for the nozzle having variable flow pattern characteristics depending upon the shiftable position of the sleeve member relative to the body part.

*5. The fire hose nozzle of claim 1 wherein said barrel member includes a wall part defining reaction surface means which liquid when flowing through said barrel member contacts for urging said barrel member from its said rearward position into its said forward position.*

*6. In a fire hose nozzle including a tubular body part having an inlet end and an outlet end, a valve assembly in said body part and including a valve head and a valve stem, the improvement comprising a barrel member having fore and aft ends surrounding said valve stem, the aft end of said barrel member fitting slidably within the outlet end of said body part, said barrel member being shiftable longitudinally relative to said body part between a forward position in which the barrel member fore end spacedly encircles said valve head and a rearward position in which the barrel member fore end is shifted rearwardly of the valve head to increase the spacing between the barrel member and valve head, said barrel member including a wall part defining a liquid flow path from a location internally of said body part to adjacent said valve head, said wall part including reaction surface means which liquid when flowing through said barrel member contacts for urging said barrel member from its rearward position into its forward position, a sleeve member encircling the fore end of said body part and surrounding said barrel member, means rotatably connecting said sleeve member to said body part wherein rotation of the sleeve member upon the body part causes the sleeve*

*member to shift longitudinally of the body part between extended and retracted positions, said sleeve member including abutment part means for contacting said barrel member to shift the barrel member from its forward position into its rearward position as said sleeve member is shifted from its extended position into its retracted position.*

*7. The fire hose nozzle of claim 6 and biasing means yieldably urging said barrel member into its forward position.*

*8. The fire hose nozzle of claim 7 wherein said biasing means is a helical spring encircling said valve stem and abutting each of said barrel member and body part.*

*9. The fire hose nozzle of claim 7 wherein said sleeve means extends beyond said valve head in an annular spaced relationship to define in conjunction with said valve head and barrel member a liquid flow outlet for the nozzle having variable flow pattern characteristics depending upon the shiftable position of the sleeve member relative to the body part.*

* * * * *